United States Patent [19]
Ballare et al.

[11] Patent Number: 6,124,848
[45] Date of Patent: Sep. 26, 2000

[54] METHOD AND APPARATUS FOR REDUCING FLAT PANEL DISPLAY HORIZONTAL SCAN SIGNAL INTERFERENCE IN THE ELECTROSTATIC PEN OPERATED DIGITIZER

[75] Inventors: Daniel E. Ballare; Jerzy A. Teterwak, both of Colorado Springs, Colo.

[73] Assignee: LSI Logic Corporation, Milpitas, Calif.

[21] Appl. No.: 08/904,735

[22] Filed: Aug. 1, 1997

[51] Int. Cl.[7] ........................................ G09G 5/00
[52] U.S. Cl. .................. 345/179; 178/19.07; 178/18.02; 345/173
[58] Field of Search ............... 178/18.01, 18.03, 178/19.01–19.07, 18.04, 18.06, 20.01–20.04, 18.07, 18.02; 345/173–179

[56] References Cited

U.S. PATENT DOCUMENTS

| | | | |
|---|---|---|---|
| Re. 34,476 | 12/1993 | Norwood | 382/13 |
| 3,711,641 | 1/1973 | Palmer | 178/6.6 |
| 4,672,154 | 6/1987 | Rodgers et al. | 178/18 |
| 4,672,974 | 6/1987 | Lee | 128/673 |
| 4,698,461 | 10/1987 | Meadows et al. | 345/174 |
| 4,730,186 | 3/1988 | Koga et al. | 340/708 |
| 4,736,073 | 4/1988 | Abernethy | 178/19 |
| 4,771,138 | 9/1988 | Dhawan | 178/19 |
| 4,794,208 | 12/1988 | Watson | 178/19 |
| 4,839,634 | 6/1989 | More et al. | 340/712 |
| 4,873,398 | 10/1989 | Hubby, Jr. | 178/18 |
| 5,053,757 | 10/1991 | Meadows | 345/173 |
| 5,066,833 | 11/1991 | Zalenski | 178/19 |
| 5,113,042 | 5/1992 | Mletzko | 178/18.02 |
| 5,138,118 | 8/1992 | Russell | 178/19 |
| 5,179,254 | 1/1993 | Mcdermott | 178/18.02 |
| 5,194,852 | 3/1993 | More et al. | 340/712 |
| 5,436,639 | 7/1995 | Arai et al. | 345/156 |
| 5,454,046 | 9/1995 | Carman, II | 382/186 |
| 5,511,148 | 4/1996 | Wellne | 395/106 |
| 5,571,997 | 11/1996 | Gray et al. | 178/18 |
| 5,592,197 | 1/1997 | Tagawa | 345/173 |
| 5,635,683 | 6/1997 | McDermott et al. | 178/18 |

*Primary Examiner*—Dennis-Doon Chow
*Assistant Examiner*—Amr Awad

[57] ABSTRACT

A flat panel display is coupled with an electrostatic stylus driven digitizing panel to produce a display and digitizer system having an interference control feature. The interference control feature first determines the operating frequency of the flat panel display and/or the operating frequency of the stylus. The interference controller may then incrementally reduce the operating frequency of the flat panel display and/or the operating frequency of the stylus until the operating frequency causing the least interference is ascertained. Once the operating frequency causing the least interference is ascertained the interference controller selects new operating parameters for the display and digitizer system.

32 Claims, 5 Drawing Sheets

METHOD AND APPARATUS FOR REDUCING FLAT PANEL DISPLAY HORIZONTAL SCAN SIGNAL INTERFERENCE IN THE ELECTROSTATIC PEN OPERATED DIGITIZER

STATEMENT UNDER 37 CFR 1.71(d) and (e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to flat panel displays operably utilized in conjunction with an electrostatic pen operated digitizer, and more particularly related to a method and apparatus for reducing pen/stylus signal interaction.

BACKGROUND AND OBJECTS OF THE INVENTION

Electrostatic, stylus driven digitizing panels are commonly configured with a flat panel display such that the display scan signal is coupled to the digitizing panels channel inputs. This causes the signal emitted from the display surface to capacitively couple with the digitizing panel's sensing layer. This in turn has the highly undesirable effect of introducing uncertainty in stylus position determinations so as to reduce the effective resolution of the display and digitizer system.

Flat panel displays typically have a scan signal with a square waveform of between 15 kHz and 20 kHz. The frequency of a typical pen or stylus is between 100 kHz and 200 kHz. Because the typical display horizontal scan signal is wide band, some harmonics of the signal fall within the normal pen or stylus frequency range. Since designers rarely have the opportunity to select the pen or stylus and display scan frequencies this interference is difficult to design around. Even where the designer has full control over pen/stylus and display frequencies the pen frequency often has an associated tolerance (e.g., where the pen frequency is not crystal controlled) which causes frequency uncertainties. This problem is compounded where different display resolutions (and frequencies) are utilized.

It is, therefore, a primary object of the present invention to provide a method and an apparatus for reducing pen or stylus and display signal interactions. Another object of the present invention is to provide a method and apparatus for dynamically adjusting the display horizontal scan frequency so as to reduce pen or stylus and display signal interactions. A further object of the present invention is to provide a method and apparatus for allowing a user to optimize the display horizontal scan frequency so as to reduce pen or stylus and display scan signal interference. Yet a further object of the present invention is to provide a method and apparatus for automatically adjusting the horizontal scan frequency of a display and digitizer system whenever signal interference is detected.

SUMMARY OF THE INVENTION

The present invention teaches a method and apparatus for reducing horizontal scan frequency interference in a display/digitizer system. In accordance with the invention, a flat panel display is coupled with an electrostatic stylus driven digitizing panel to produce a display and digitizer system having an interference control feature. The interference control feature in a preferred embodiment may first determine either or both the operating frequency of the flat panel display and the operating frequency of the stylus. The interference controller may then incrementally adjust (reduce or increase) the operating frequency of either or both of the operating frequency of the flat panel display and the operating frequency of the stylus until the operating frequency causing the least interference is ascertained. Once the operating frequency causing the least interference is ascertained the interference controller selects new operating parameters for the display/digitizer system.

In preferred operation the present invention may be constructed from a flat panel display, a digitizing panel, and a controller operably connected to the display. The controller may control the display's horizontal scan frequency, display a target on the display, prompt a user to hold the stylus to the target, incrementally adjust the horizontal scan frequency, ascertain the horizontal scan frequency with the least interference, and adjust the horizontal scan frequency to the frequency having the least interference.

BRIEF DESCRIPTION OF THE DRAWINGS

A preferred embodiment of the present invention is described hereafter, by way of example only, with reference to the accompanying drawings in which:

FIG. 4A illustrates the noise level without application of the present invention and FIG. 4B illustrates the corresponding noise level with application of the present invention.

DETAILED DESCRIPTION

Figure 1:
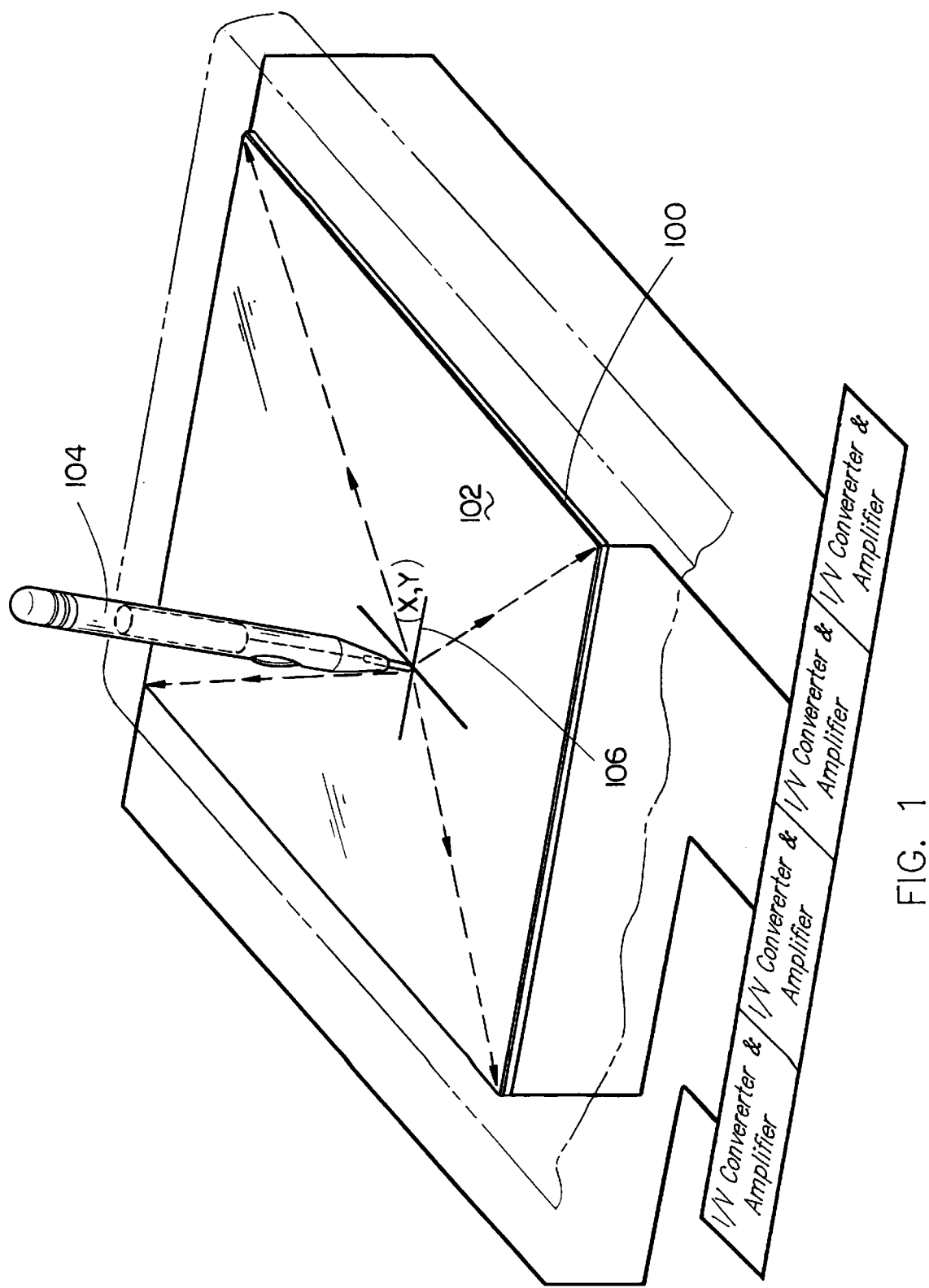
FIG. 1 is a diagrammatic perspective drawing of certain components of a display/digitizer system.

The following co-pending and co-owned United States Patent Applications are incorporated herein by reference: (1) *Cancellation of Common-Mode Signals in Digitizing Tablet,* U.S. patent application Ser. No. 08/192,078 (filed Feb. 4, 1994); and (2) *Compensation of Stylus Signals in Digitizing Tablet,* U.S. patent application Ser. No. 08/286,720 (filed Aug. 5, 1994). In the interest of providing a full and complete disclosure there is annexed hereto Appendix A which provides an exemplary driver program for reducing the interference in a display/digitizer system.

In an exemplary embodiment the present invention may be constructed from and include, for example, the SYM93C2000 WriteTouch™ Interface Controller. This controller is available from Symbios Logic, Colorado Springs, Colo. The WriteTouch™ is capable of stylus events by measuring the corner currents injected by the stylus. Differences in the corner currents reveal the location directly under the tip of the stylus. In touch mode, an active indium tin oxide sensor is biased with a voltage, and the measured corner currents are the additional currents required to feed the added finger capacitance. The sensor panel includes a glass writing surface with an under coating of indium-tin-oxide (ITO). Preferably a polyester spall shield is attached over the ITO coating in order to prevent shattering if the glass is broken. The underside of the shield is also coated with a grounded ITO layer in order to shield the sensor from LCD electrical noise. The top layer of the glass writing surface is provided with a grounded fine grid ITO coating pattern in order to eliminate hand effects. The active ITO layer is slightly resistive and divides the stylus (or finger) current among four corner wires. The corner current signals carried by these wires are proportional to the ITO conductivity between each individual corner and the finger location.

While the WriteTouch™ provides a currently preferred implementation of the system of the present invention, it will be appreciated, a system of the present invention may be assembled which utilizes a membrane, infrared, electromagnetic, or resistive based touch screen sensors or the like.

The source code of a driver program for use with Microsoft® Windows 95® is appended hereto as Appendix A. This program, by way of example only, may be utilized to implement the system of the present invention where a general purpose computer running Windows 95® is utilized with the WriteTouch™. It will be appreciated that the invention of the present invention may be implemented with other operating systems and, likewise, with dedicated computers.

In operation, an exemplary embodiment of the present invention may be constructed with a computer, for example, having an IBM PC type architecture and a touch screen connected to the computer as an I/O device. The touch screen may be, for example, a Symbios Logic® SYM93C2000 controller, a Scriptel Corporation (Columbus, Ohio) WriteTouch™ electrostatic sensor panel, and a software driver to interface the SYM93C2000 to an operating system such as Microsoft® Windows 95®. The computer, for example, may operate application environment software such as Microsoft® WinPad® in conjunction with an additional driver such as set forth in Appendix A.

Appendix A is a driver program (Microsoft® Windows 95® Message Interface) which allows operation of a currently preferred embodiment of the present invention. The invention is related to an electrostatic, stylus driven digitizing panel. A typical solution for this kind of panel is shown in FIG. 1. The panel 102 is built out of a resistive plate covered with a nonconductive layer. The stylus 104 has a built in AC voltage source with an output connected to the stylus tip. When the tip touches the plate it capacitively couples to the resistive layer causing electric current to flow to the corners of the panel 102. The stylus 104 position is based on the corner current ratio.

As previously noted, one of the problems existing in the above solution is the coupling of the display horizontal scan signal to the channel inputs. The signal emitting from the display surface capacitively couples to the digitizer sensing layer, thus, introducing uncertainty to the stylus 104 position determination and reducing system resolution. The display scan signal is a square waveform of typically 15 kHz to 20 kHz in frequency. The typical stylus 104 operating frequency is between 100 kHz to 200 kHz. The scan signal, however, is a wide band signal which contains many harmonics which fall into the pen frequency range. Moreover, the harmonics are spaced only by 15 to 20 kHz so the probability of the digitizer 102 operating bandwidth overlapping one of the harmonics is relatively high. If at the time the digitizer 102 is added to the system, the designer has full control of the stylus 104 and scan frequencies, the interference of both can be avoided. However, the stylus 104 frequency may be fixed, i.e., non adjustable. In addition, the stylus 104 frequency may have an associated tolerance creating an uncertainty as to the actual frequency (e.g., where the stylus frequency is not crystal controlled. Additional problems arise whenever different display resolutions (and frequencies) are selected. The display scan frequency may also not be known to the system designer of the digitizer is an add on device temporarily mounted on the top of the display 100. In this situation, there is some probability that the system will fail to work properly due to the display scan signal interference.

Figure 2:
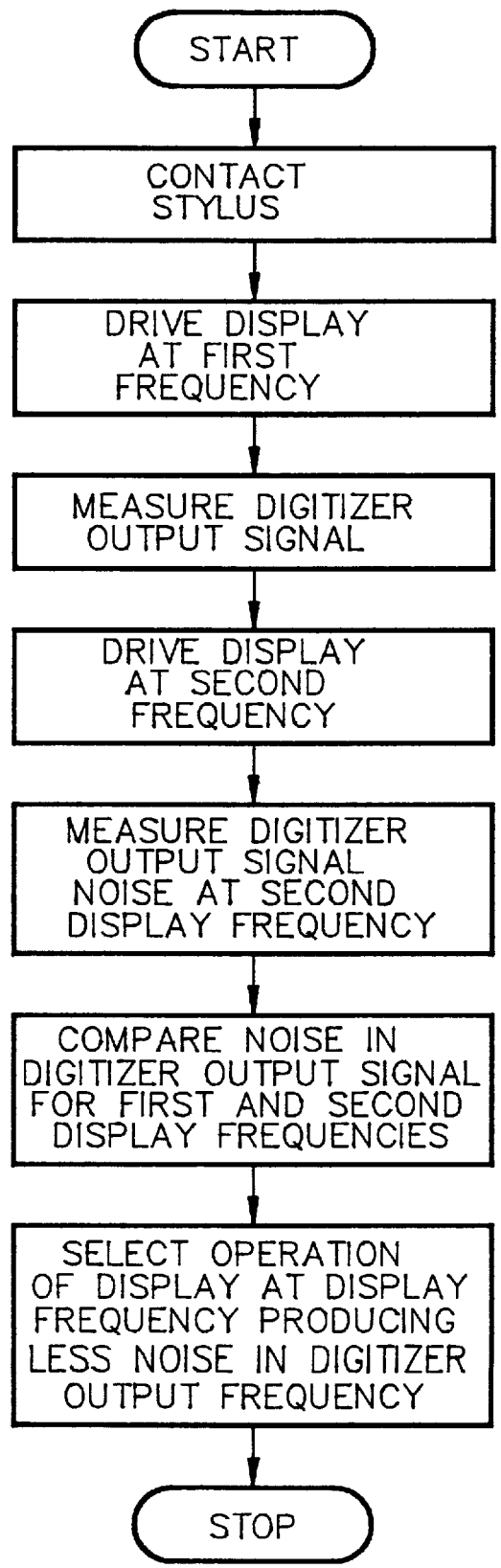
FIG. 2 is a flow diagram illustrating a preferred embodiment of the present invention.

Referring now to FIG. 2, a flow diagram of a preferred embodiment of the present invention is shown. In a preferred embodiment, the scan signal interference is eliminated by adding an initial calibration step to the digitizer operation. The calibration has to be performed only once for a given system-pen-display resolution combination (i.e., calibration need only be repeated upon changing resolution or stylus). During the calibration, the display scan frequency is dynamically changed in a small range and the digitizer noise is measured. Finally, the scan frequency which gives the best performance of the digitizer is set.

In operation, a preferred method of reducing interference in accordance with the invention is to dynamically modify the flat display 100 horizontal scan frequency so as to reduce stylus 104 and scan signal interaction. In an exemplary embodiment a user is asked to touch the digitizer panel 102 with the stylus 104 and hold the stylus steady briefly. During this brief time period, the digitizer software driver (e.g., Appendix A) re-programs the video controller chip to slightly modify the scan frequency and measures the digitizer noise for the new frequency. This procedure is repeated several times (typically 5 to 12) and each time a different scan frequency is programmed to the controller chip. At the end, the frequency for which the lowest digitizer noise has been measured, is set. Typically, the scan frequency is modified within about ±5.0% range. This change in the frequency does not cause any visible changes in the image quality.

As shown in FIG. 2., the calibration algorithm is initiated by the software program, and list of display frequencies is generated. The user then contacts the stylus to the digitizer panel. The display is driven at the first frequency, and the noise present in the digitizer output signal for that frequency is measured. If the present frequency is not the last frequency, then the display is driven at the next frequency.

The noise in the digitizer output signal at the next frequency is measured, and the process is repeated for all succeeding display frequencies until the last frequency is reached. Subsequent to the noise in the digitizer output signal at the last frequency being measured, operation of the display at the display frequency producing the least amount of noise in the digitizer output signal is selected at which point the calibration algorithm then terminates.

During the calibration process, the noise in the digitizer output signal is determined in the following manner. The software driver calculates the digitizer noise level for each frequency. This is accomplished by collecting a number of samples of the X and Y coordinate and estimating the position standard deviation $\sigma_{xy}$ (which represents the noise level) using the following formula:

$$\sigma_x^2 = \frac{1}{N-1}\left(\sum_{k=0}^{k=N-1} X_k^2 - \frac{1}{N}\left(\sum_{k=0}^{k=N-1} X_k\right)^2\right)$$

$$\sigma_y^2 = \frac{1}{N-1}\left(\sum_{k=0}^{k=N-1} Y_k^2 - \frac{1}{N}\left(\sum_{k=0}^{k=N-1} Y_k\right)^2\right)$$

$$\sigma_{xy} = \sqrt{\sigma_x^2 + \sigma_y^2}$$

Figure 3:
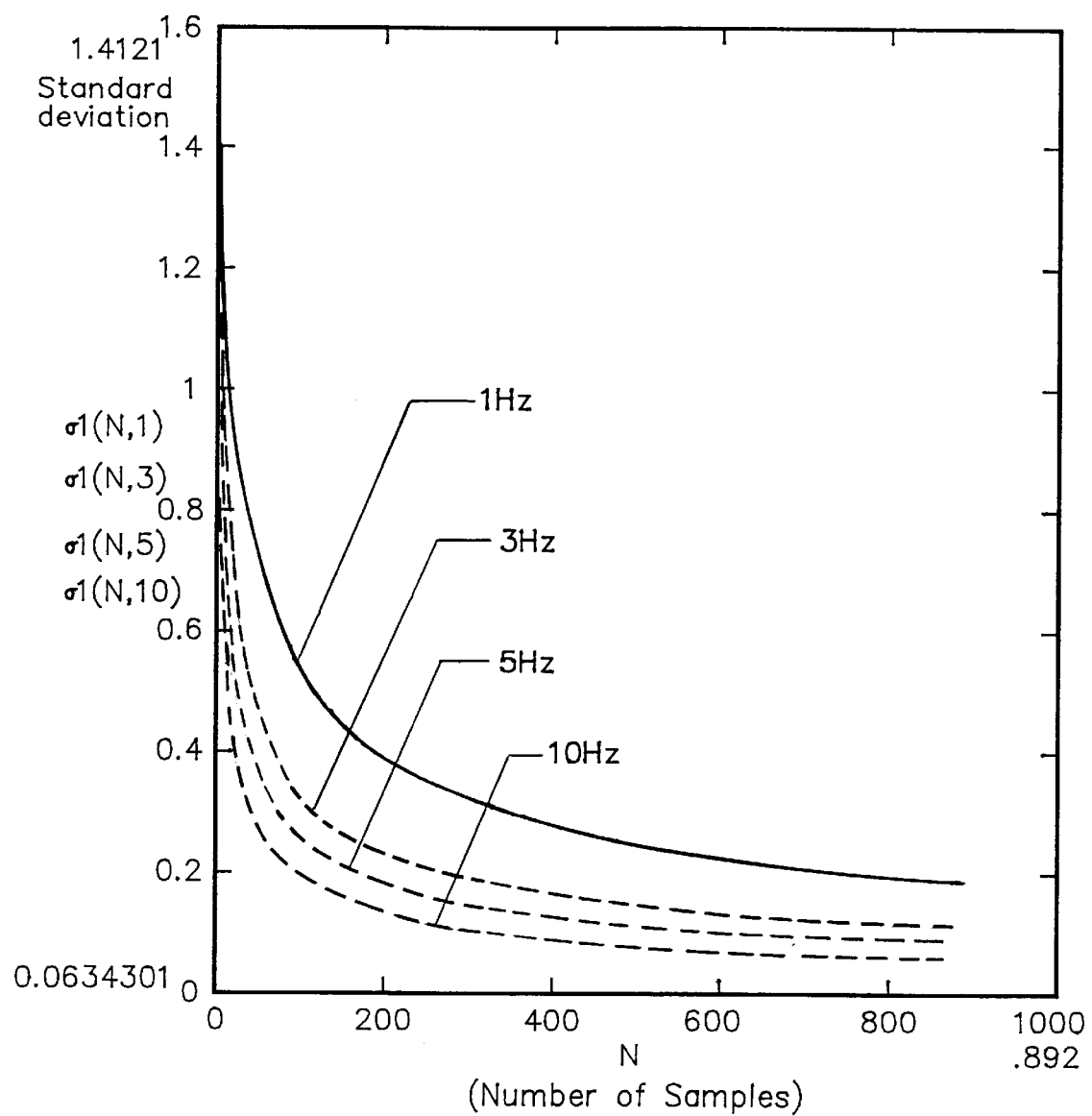
FIG. 3 is a graphical illustration of the dependence of the $\sigma_{xy}$ standard deviation which corresponds to the noise calculation uncertainty of five different filter cutoff frequencies.

The number of X and Y coordinate samples taken is important. Too few samples results in a $\sigma_{xy}$ having a high variance level. Too many samples results in an unnecessarily long calibration process. Determining the right number of samples is critical and should include an analysis of the level of X and Y filtration obtained before data is sent to the host computer. The heavier the filtration the more samples are necessary (heavy filtration causes samples to be significantly correlated, and more samples are necessary to calculate noise with a sufficient confidence level). FIG. 3 illustrates the dependence of the $\sigma_{xy}$ standard deviation (which corresponds to the noise calculation uncertainty) on the number of samples used in the calculation. FIG. 3 illustrates five curves showing the dependence for five different coordinate filter cutoff frequencies.

FIG. 3 is valid for 100 samples per second coordinate sampling rate. If the sampling rate is different proper scaling must be done. For instance, for the sampling rate of 200 coordinate pairs per second the frequency labels on the graph should be changed as follows: 1 Hz to 2 Hz, 3 Hz to 6 Hz, 5 Hz to 10 Hz, and 10 Hz to 20 Hz.

Figure 4A:
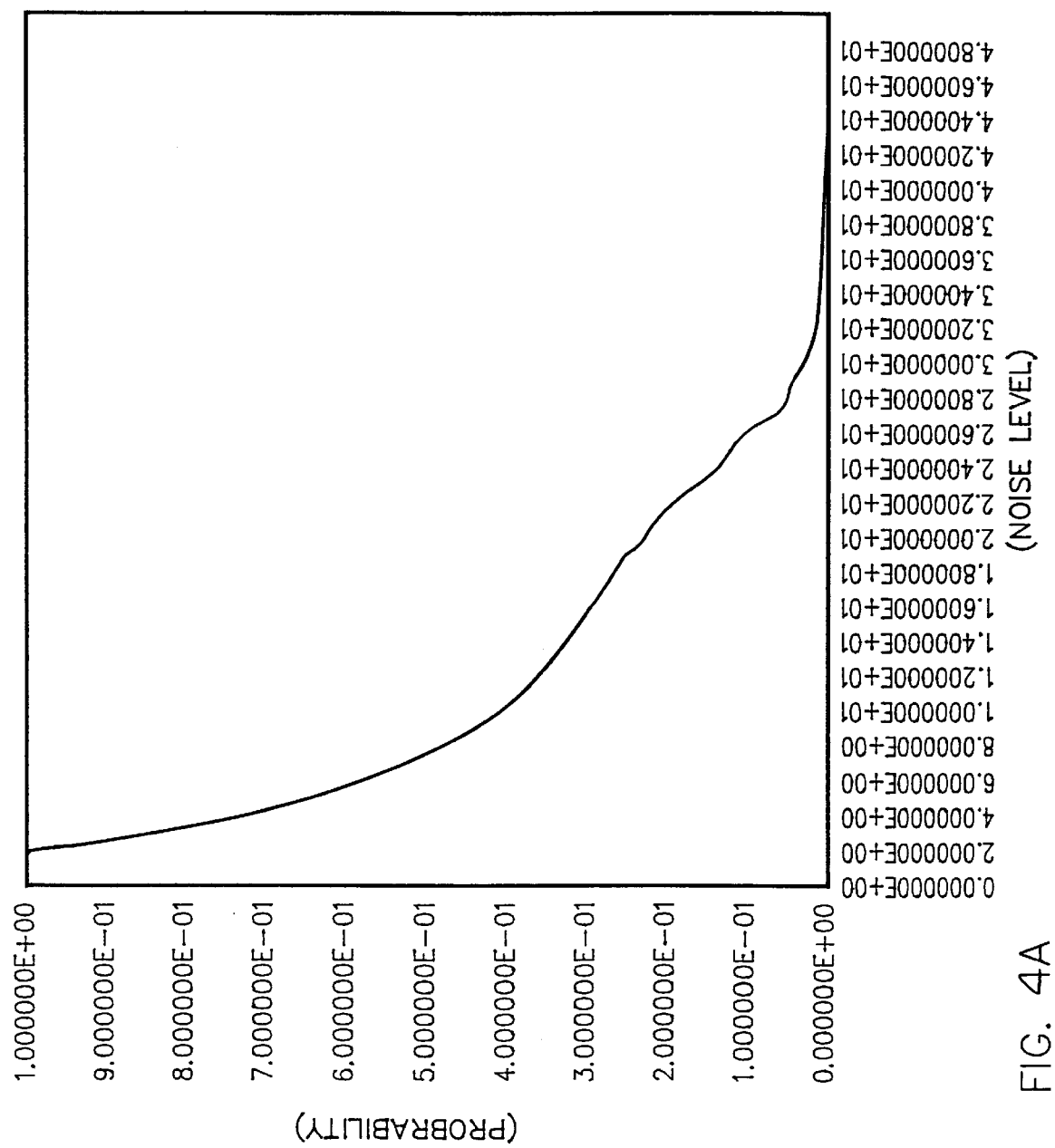
FIGS. 4A and 4B are graphical illustrations of a probability curve for a randomly selected pen wherein the coordinate noise level is higher for the corresponding level on the horizontal axis.
Figure 4B:
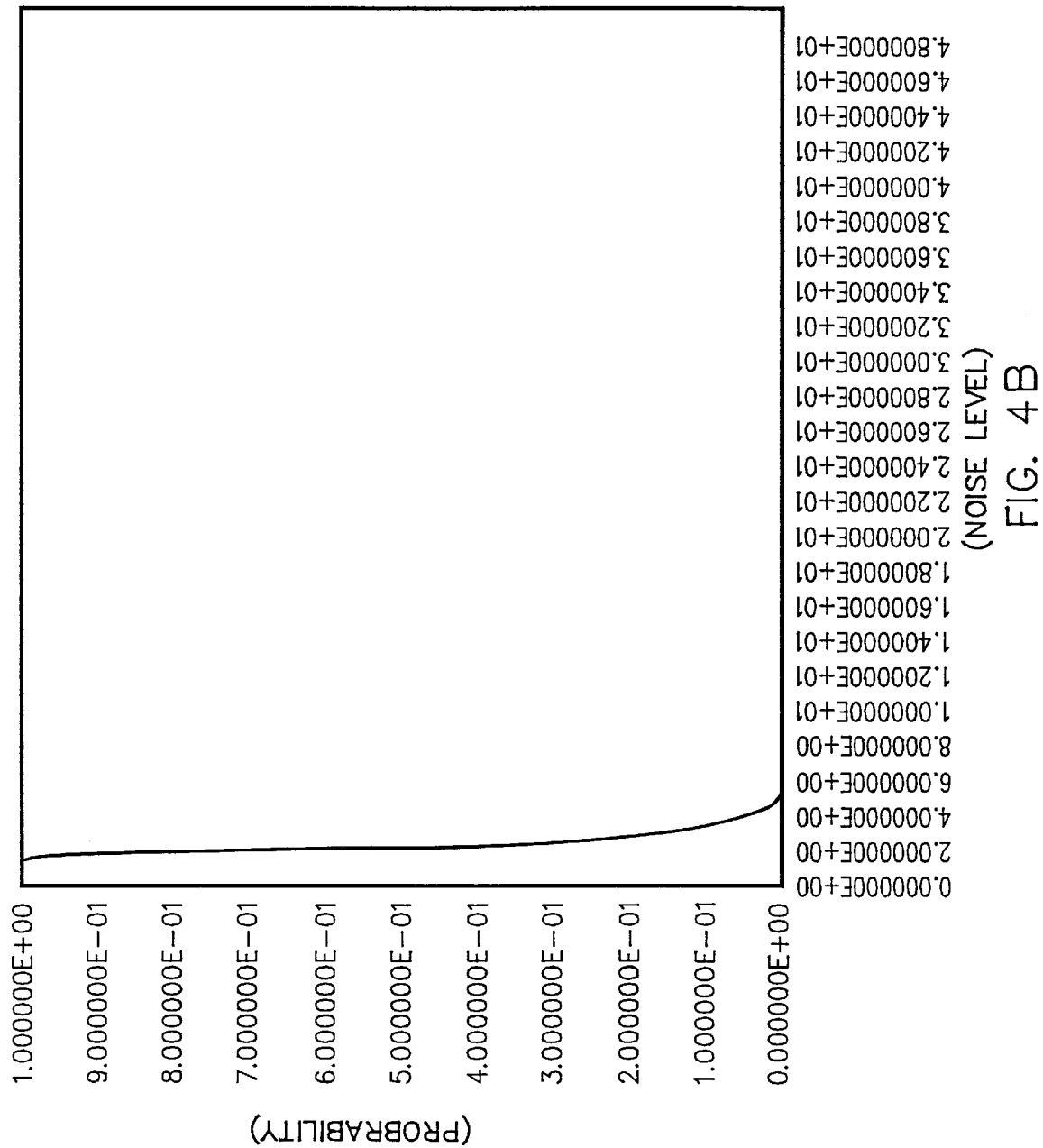

The effectiveness of the described method is illustrated in FIGS. 4A and 4B. This data assumes the frequency of the stylus had a tolerance of ±8.0% and the display scan frequency was 15 kHz. The horizontal axis shows the coordinate noise level. The vertical axis shows probability. The curve shows the probability the randomly selected stylus coordinate noise level will be higher than the corresponding value on the horizontal axis. FIG. 4A illustrates the absence of the method of the present invention. FIG. 4B illustrates the results obtained with the application of the invention of the present invention. During the calibration process, the best scan frequency was chosen from eight (8) frequency points tested. The eight (8) frequency values were uniformly distributed with ±5.0% of the nominal scan frequency range.

While the invention has been particularly shown and described with reference to a preferred embodiment thereof, it will be understood by those skilled in the art that various changes and modifications in form and details may be made therein without departing from the spirit and scope of the invention according to the following claims.

Source Code Provided Under 37 CFR 1.96(a)(2)(i)

APPENDIX "A"

```
#define BGW 0  // backgroundwhite
#define SHOWRESULTS 1
/* VclkDLG.c:
     Calibrate Dialog.
         This module contains the Calibrate Dialog
WndProc and related functions for the top-level dialog.
*/
/********Includes and Controlling Defines************/
#include "cal.h"
#include "calerr.h"
#include "_caldlg.h"
#include "..\ourpen.h"
#include <stdio.h>
#include <commctrl.h>        // required for common
controls
#include <winerror.h>
// #include "verpcal.h"
#include "..\penui\defines.h"
#include "fgen.h"
/***************Defines***********************/
#define MAXPOS 23   // used for progress bar
#define STEPSIZE 1
#define START_TIMER        1
#define VCLK_TIMER         2
#define FINAL_TIMER        3
#define PROGBAR_TOP      10
#define PROGBAR_HEIGHT 35
#define HW_CALIBRATE      0x00010000
    int Xextent ;  // size of screen in pixels
    int Yextent ;
    int XpixelSize;  // size of one pixel in WTIC units (full
screen == 3ffhex)
    int YpixelSize;
    DWORD CurrentMode;
/****************Macros********************/

/****************Typedefs*******************/

/****************Variables*******************/
extern HWND vhDlgCal;
extern HWND vhDlgVerify;
static HWND hProgress;
static WORD    wCorner=0;
static int    RatioIndex;
#define MAXPOINTS     16
#define MAXPENPOINTS  8
#define MAXTOUCHPOINTS 8
static POINT  rgptCross[MAXPOINTS];
static POINT  ScreenCenter;
int min;
int max;
int place;
int show;
int Win;
POINT PointBuffer [MAXPOINTS];
POINT CrossBuffer [MAXPOINTS];

//---------------------- Vclk variables

HANDLE hVclkSettings = 0;
PCLKSETTING ListVclkSettings;
HANDLE hTVclkSettings = 0;
PCLKSETTING TListVclkSettings;
HANDLE hFVclkSettings = 0;
PCLKSETTING FListVclkSettings;
CLKRATIO VclkValues, VclkValuesOrig;
TESTPARAM VtestP;
DWORD VclkTest;
DWORD VclkRanges;
BOOL StartFlag = FALSE;
int PaintCode;
CLKSETTING VclkSettings[10];
long GetNoise(long*);

//---------------------- Vclk variables extern JWTIC_CALBSTRUCT wticCalOrig;
extern JWTIC_CALBSTRUCT wticCalStart;
HANDLE  hDriverPen;
static PENINFO pi;
static char  szInstructionsTemp[INST_STR_MAX_LEN];
static char  szInstructions[INST_STR_MAX_LEN];
static har CODECONST szDisplayDriver[] = "Display Driver";
static char CODECONST szDisplayOrientation[] = "DisplayOrientation";
extern BOOL fDrawCursor;
static BOOL fEatNextMouseEvent = FALSE;

extern long XHit;
extern long YHit;

/***************** Local prototypes *************/

/***************** EXPORT FUNCTIONS ********/

/*
PURPOSE: Dialog procedure for the top-level Vclk
calibration dialog.
RETURN:
GLOBALS: vhDlgCal
CONDITIONS:
*/
BOOL FAR PASCAL _loadds CalVclkDlg(
    HWND  hDlg,
    WORD  wMessage,
```

```c
            WORD   wParam,
            LONG   lParam)
{
static DWORD dwInfo;
static long tcount;
    switch(wMessage)
        {
        case WM_INITDIALOG:
            vhDlgCal = hDlg;
            InitCommonControls();
            PaintCode = 0;
            ListVclkSettings            =
(PCLKSETTING)GetMem(  sizeof(CLKSETTING)   *
NUM_VCLK_TESTS, &hVclkSettings);
            TListVclkSettings           =
(PCLKSETTING)GetMem(  sizeof(CLKSETTING)   *
NUM_VCLK_TESTS, &hTVclkSettings);
            // final test list for win,place,show
            FListVclkSettings           =
(PCLKSETTING)GetMem(  sizeof(CLKSETTING)  *  3,
&hFVclkSettings);
            if (ListVclkSettings == NULL)
                {
CalError(CALERR_CANTOPENPENDRIVER);
                return FALSE;
                }
            else
                {
                for    (RatioIndex=0;RatioIndex    <
NUM_VCLK_TESTS ; RatioIndex++)
                    {
(ListVclkSettings+RatioIndex)->NoiseValue = 0;
                    }
                RatioIndex = 0 ;
                }
            if ((hDriverPen = OpenDriver("pen", NULL,
NULL)) == 0L)
                {
CalError(CALERR_CANTOPENPENDRIVER);
                return FALSE;
                }
            if        (SendDriverMessage(hDriverPen,
DRV_GetPenInfo,
                    (DWORD)(LPPENINFO)&pi,
NULL) == 0L)
                {
                CalError(CALERR_NOPEN);
                return FALSE;
                }
            if ((pi.lPdc & PDC_INTEGRATED) == 0)
                {
                CalError(CALERR_OPAQUE);
                return FALSE;
                }
            if        (SendDriverMessage(hDriverPen,
DRV_GetMode,
(DWORD)(LPDWORD)&CurrentMode, NULL) == 0L)
                {
                CalError(CALERR_OLDPENDRIVER);
                return FALSE;
                }
            if (CurrentMode != PEN_MODE )
                {
                CalError(CALERR_NOPEN);
                return FALSE;
                }
            if        (SendDriverMessage(hDriverPen,
DRV_GetCalibration,
(DWORD)(LPJWCALBSTRUCT)&wticCalOrig, NULL) ==
0L)
                {
                CalError(CALERR_OLDPENDRIVER);
                return FALSE;
                }

// Get starting point for video frequency
settings.
            if        (SendDriverMessage(hDriverPen,
DRV_GetVclkValues,
(DWORD)(LPDWORD)&VclkValuesOrig, NULL) == 0L)
                {
                CalError(CALERR_OLDPENDRIVER);
                return FALSE;
                }
            VtestP.nominalN = VclkValuesOrig.n ;
            VtestP.nominalD = VclkValuesOrig.d ;
            VtestP.percentAbove = 0;
            VtestP.percentBelow = 10;
            VtestP.numTests = NUM_VCLK_TESTS;
            if        (SendDriverMessage(hDriverPen,
DRV_GetVclkRanges, (DWORD)(LPDWORD)&VclkRanges, NULL) == 0L)
                {
                CalError(CALERR_OLDPENDRIVER);
                return FALSE;
                }

// pick out the range bytes from the dword

VtestP.maxN    =    (int)((VclkRanges   &
0xff000000 ) >> 24);
            VtestP.minN    =    (int)((VclkRanges   &
0x00ff0000 ) >> 16);
            VtestP.maxD    =    (int)((VclkRanges   &
0x0000ff00 ) >> 8);
            VtestP.minD    =    (int)(   VclkRanges   &
```

```
0x000000ff );
        SetWindowPos(vhDlgCal,
HWND_TOPMOST, 0, 0,
                GetSystemMetrics(SM_CXSCREEN),
GetSystemMetrics(SM_CYSCREEN),
                SWP_SHOWWINDOW);
            BLOCK
            {
                RECT rect;
                int dxOffset;
                int dyOffset;
                GetClientRect(vhDlgCal,
(LPRECT)&rect);
                Xextent = rect.right - rect.left;
                Yextent = rect.bottom - rect.top;
                XpixelSize = 0x4000/Xextent;
                YpixelSize = 0x4000/Yextent;
                dxOffset = Xextent/10;
                dyOffset = Yextent/10;
                ScreenCenter.x = Xextent/2;
                ScreenCenter.y = Yextent/2;

// Locate all crosses to define text
location
                // even though only one cross will be
displayed.
                rgptCross[0].x = rect.left + dxOffset/2 - 1;
                rgptCross[0].y = rect.top + dyOffset/2 - 1;
                rgptCross[1].x = rect.left + dxOffset*19/2 -
1;
                rgptCross[1].y = rect.top + dyOffset/2 - 1;
                rgptCross[2].x = rect.left + dxOffset/2 - 1;
                rgptCross[2].y = rect.top + dyOffset*19/2 -
1;
                rgptCross[3].x = rect.left + dxOffset*19/2 -
1;
                rgptCross[3].y = rect.top + dyOffset*19/2 -
1;
                rgptCross[4].x = rect.left + dxOffset*3 - 1;
                rgptCross[4].y = rect.top + dyOffset*3 - 1;
                rgptCross[5].x = rect.left + dxOffset*7 - 1;
                rgptCross[5].y = rect.top + dyOffset*3 - 1;
                rgptCross[6].x = rect.left + dxOffset*3 - 1;
                rgptCross[6].y = rect.top + dyOffset*7 - 1;
                rgptCross[7].x = rect.left + dxOffset*7 - 1;
                rgptCross[7].y = rect.top + dyOffset*7 - 1;
                hProgress                        =
CreateWindow(PROGRESS_CLASS,
                                "Progress", WS_CHILD|WS_VISIBLE|WS_BORDER,
                                rect.right/4,
                                PROGBAR_TOP,
                                rect.right/2,
                                PROGBAR_HEIGHT,
                                vhDlgCal,
                                NULL,
                                vhInst,
                                NULL);

SendMessage(hProgress,PBM_SETRANGE,0,MAKELONG
(0,MAXPOS));

SendMessage(hProgress,PBM_SETSTEP,(WPARAM)STEP
SIZE, 0);
            } // end block // Done with initialization.
            // Test will start when user
            // presses pen against tablet.
            // see case WM_LBUTTONDOWN: (below)

return FALSE;
        case WM_RunVclkCal:  // starts test when user
presses pen tip
            if    (SendDriverMessage(hDriverPen,
DRV_GetMode, (DWORD)(LPDWORD)&CurrentMode, NULL) == 0L)
            {
                CalError(CALERR_OLDPENDRIVER);
                return FALSE;
            }

// Support Pen mode only for now.
            if (CurrentMode != PEN_MODE)
            {
                CalError(CALERR_NOPEN);
                return FALSE;
            }

// setup starting values before calibration
begins.
            wticCalStart = wticCalOrig;
            wticCalStart.Err = 10000L;    // for no
calibration
            SendDriverMessage(hDriverPen,
DRV_SetCalibration, (DWORD)(LPJWCALBSTRUCT)&wticCalStart, NULL);
            if    (SendDriverMessage(hDriverPen,
DRV_GetVclkValues, (DWORD)(LPDWORD)&VclkValues, NULL) == 0L)
            {
                CalError(CALERR_OLDPENDRIVER);
                return FALSE;
            }
            VtestP.nominalN = VclkValues.n ;
            VtestP.nominalD = VclkValues.d ;
            if (VtestP.nominalN == 0 || VtestP.nominalD
== 0 )
            {
```

12

```
            // prevent divide by zero errors.
            CalError(CALERR_BADVCLK);
            PostMessage(hDlg, WM_CLOSE, NULL,
NULL); // quit.
            return FALSE;
        }
        // Fill the list with trial n and d values.
        get_all_clk_ratios(ListVclkSettings,&VtestP);
        PaintCode = 0;
        InvalidateRect(hDlg, NULL, FALSE);
        RatioIndex = 0;

// start timer.

SetTimer(hDlg,   START_TIMER,   3000,
NULL);
        return TRUE;
    case WM_TIMER:
        switch (wParam)
        {
        case VCLK_TIMER:
            if (RatioIndex < NUM_VCLK_TESTS)
            {
                SendMessage(hProgress, PBM_STEPIT,
0,0);
                PaintCode = 1;
                InvalidateRect(hDlg, NULL, FALSE);
                KillTimer(hDlg, VCLK_TIMER);
                VclkValues.n                        =
(BYTE)(ListVclkSettings+RatioIndex)->n;
                VclkValues.d                        =
(BYTE)(ListVclkSettings+RatioIndex)->d;

// Set Video frequency to a test value
                SendDriverMessage(hDriverPen,
DRV_SetVclkValues,
                    (DWORD)(LPDWORD)&VclkValues,
NULL);
                SendDriverMessage(hDriverPen,
DRV_GetVclkValues, (DWORD)(LPDWORD)&VclkValues, NULL);
                SendDriverMessage(hDriverPen,
DRV_EnableDataCollect,
                    NULL, NULL);
                (ListVclkSettings+RatioIndex)->n   =
(int)VclkValues.n;
                (ListVclkSettings+RatioIndex)->d   =
(int)VclkValues.d;

(ListVclkSettings+RatioIndex)->NoiseValue          =
GetNoise(&tcount);

(TListVclkSettings+RatioIndex)->NoiseValue         =
(ListVclkSettings+RatioIndex)->NoiseValue;
                (ListVclkSettings+RatioIndex)->tc  =
tcount;

RatioIndex++;
                SetTimer(hDlg,   VCLK_TIMER,   100,
NULL);
            }
            else
            {
                KillTimer(hDlg, VCLK_TIMER);

// get results of first test max                                 =
MaxNoiseIndex(TListVclkSettings,NUM_VCLK_TESTS);
                min                                 =
MinNoiseIndex(TListVclkSettings,NUM_VCLK_TESTS);
                (TListVclkSettings+min)->NoiseValue =
0x7fffffff;
                place                               =
MinNoiseIndex(TListVclkSettings,NUM_VCLK_TESTS);
                (TListVclkSettings+place)->NoiseValue =
0x7fffffff;
                show                                =
MinNoiseIndex(TListVclkSettings,NUM_VCLK_TESTS);
                PaintCode = 2;
                InvalidateRect(hDlg, NULL, FALSE);
                RatioIndex = 0;

// Set up for the final showdown!!!
                (FListVclkSettings+0)->n            =
(ListVclkSettings+min)->n;
                (FListVclkSettings+0)->d            =
(ListVclkSettings+min)->d;
                (FListVclkSettings+1)->n            =
(ListVclkSettings+place)->n;
                (FListVclkSettings+1)->d            =
(ListVclkSettings+place)->d;
                (FListVclkSettings+2)->n            =
(ListVclkSettings+show)->n;
                (FListVclkSettings+2)->d            =
(ListVclkSettings+show)->d;
                SetTimer(hDlg,   FINAL_TIMER,   100,
NULL);
            }
            break;
        case FINAL_TIMER:
            if (RatioIndex < 3 )
            {
                SendMessage(hProgress, PBM_STEPIT,
0,0);
                PaintCode = 3;
                InvalidateRect(hDlg, NULL, FALSE);
                KillTimer(hDlg, FINAL_TIMER);
                VclkValues.n                        =
(BYTE)(FListVclkSettings+RatioIndex)->n;
                VclkValues.d                        =
(BYTE)(FListVclkSettings+RatioIndex)->d;
                // Set Video frequency to a test value
                SendDriverMessage(hDriverPen,
```

13

```
DRV_SetVclkValues,
            (DWORD)(LPDWORD)&VclkValues,
NULL);
            SendDriverMessage(hDriverPen,
DRV_GetVclkValues,
(DWORD)(LPDWORD)&VclkValues, NULL);
            SendDriverMessage(hDriverPen,
DRV_EnableDataCollect,
                     NULL, NULL);
            (FListVclkSettings+RatioIndex)->n   =
(int)VclkValues.n;
            (FListVclkSettings+RatioIndex)->d   =
(int)VclkValues.d;

(FListVclkSettings+RatioIndex)->NoiseValue   =
GetNoise(&tcount);
            (FListVclkSettings+RatioIndex)->tc   =
tcount;
            RatioIndex++;
            SetTimer(hDlg, FINAL_TIMER, 100,
NULL);
            }
         else
         {
            KillTimer(hDlg, FINAL_TIMER);
            PaintCode = 4;
            InvalidateRect(hDlg, NULL, FALSE);
            SendDriverMessage(hDriverPen,
DRV_SetCalibration,
(DWORD)(LPJWCALBSTRUCT)&wticCalOrig, NULL);
            BLOCK
              {
              // verify the new settings
              FARPROC       lpfn   =
MakeProcInstance((FARPROC)VerifyVclkChangesDlg,
vhInst);
              DialogBox(vhInst,
(LPSTR)MAKEINTRESOURCE(iddVerifyVclkChanges),
                     (HWND)vhDlgCal,
(DLGPROC)lpfn);
              FreeProcInstance(lpfn);
              }
            StartFlag = FALSE;
         }
         break;
      case START_TIMER:  // delay the start of
vclk_timer
            KillTimer(hDlg, START_TIMER);
            SetTimer(hDlg, VCLK_TIMER, 100,
NULL);
            break;
      } // end switch
      return TRUE;
      case WM_AcceptVclkChanges:
            // send best values to driver.
            RatioIndex                 =
MinNoiseIndex(FListVclkSettings,3);
            VclkValues.n               =
(BYTE)(FListVclkSettings+RatioIndex)->n;
            VclkValues.d               =
(BYTE)(FListVclkSettings+RatioIndex)->d;
            SendDriverMessage(hDriverPen,
DRV_SetVclkValues,
                   (DWORD)(LPDWORD)&VclkValues,
NULL);
            PostMessage(hDlg, WM_CLOSE, NULL,
NULL); // quit.
            return TRUE;
      case WM_RefuseVclkChanges:
            // send original values to driver.
            SendDriverMessage(hDriverPen,
DRV_SetVclkValues,
(DWORD)(LPDWORD)&VclkValuesOrig, NULL);
            PostMessage(hDlg, WM_CLOSE, NULL,
NULL);
            return TRUE;
      case WM_ResetVclkChanges:
            VclkValues.n = 54;
            VclkValues.d = 10;
            SendDriverMessage(hDriverPen,
DRV_SetVclkValues,
                   (DWORD)(LPDWORD)&VclkValues,
NULL);
            PostMessage(hDlg, WM_CLOSE, NULL,
NULL);
            return TRUE;
      case WM_PAINT:
            RepaintVclkTest(vhDlgCal,PaintCode);
            return TRUE;
      case WM_SETCURSOR:
            if (fDrawCursor)
              {
              return FALSE;
              }
            else
              {
              POINT pnt;
              GetCursorPos((LPPOINT)&pnt);
              ScreenToClient(hDlg, (LPPOINT)&pnt);
              if (
                  (pnt.x  >=   (rgptCross[0].x  -
DXLINE)) &&
                  (pnt.x  <    (rgptCross[0].x  +
DXLINE)) &&
                  (pnt.y  >=   (rgptCross[0].y  -
DYLINE)) &&
                  (pnt.y  <    (rgptCross[0].y  +
DYLINE))
                  )
```

14

```
            {
                // The cursor is near the cross
hairs, so don't draw it.
                SetCursor(NULL);
                return TRUE;
            }
            else
            {
                return FALSE;
            }
        }
        case WM_ACTIVATE:
            switch (wParam)
            {
                case 2:
                    fEatNextMouseEvent = TRUE;
                    // FALLS THROUGH TO OTHER
ACTIVATE HANDLER...
                case 1:
                    fDrawCursor = FALSE;
                    break;
                case 0:
                    fDrawCursor = TRUE;
                    break;
            }
            return TRUE;
        case WM_LBUTTONUP:
            return TRUE;
        case WM_LBUTTONDOWN:
            if (StartFlag)
            return TRUE;
            if (fEatNextMouseEvent)
            {
                fEatNextMouseEvent = FALSE;
            }
            else
            {
                if (IsWticCalEvent())
                {
                    // Start the test
                    StartFlag = TRUE;
                    PostMessage(hDlg,
WM_RunVclkCal, NULL, NULL);
                }
                else
                {
CalError(CALERR_UNUSUALPENINPUT);
                    PostMessage(hDlg, WM_CLOSE,
NULL, NULL);
                }
            }
            return TRUE;

case WM_MBUTTONDOWN:
        case WM_RBUTTONDOWN:
            if (fEatNextMouseEvent)
            {
                fEatNextMouseEvent = FALSE;
                return TRUE;
            }
            // ELSE FALL THROUGH TO UNUSUAL
INPUT HANDLER
        case WM_COMMAND:
        case WM_SYSKEYDOWN:
        case WM_KEYDOWN:
        case WM_SYSKEYUP:
        case WM_KEYUP:
        case WM_CHAR:
            PostMessage(hDlg,  WM_CLOSE,  NULL,
NULL);
            //
CalError(CALERR_UNUSUALPENINPUT);

return TRUE;
        case WM_CLOSE:
            FreeMem(hVclkSettings);
            FreeMem(hTVclkSettings);
            if (hDriverPen)
            {
                CloseDriver(hDriverPen,     NULL,
NULL);
                hDriverPen = 0;
            }
            ReleaseCapture();
            EndDialog(vhDlgCal, FALSE);
            vhDlgCal = NULL;
            return TRUE;
        default:
            return FALSE;
    }
} // end CalVclkDlg
VOID  PRIVATE  RepaintVclkTest(  HWND  hwnd,int
displayType)
{
    PAINTSTRUCT   ps;
    RECT        rect, rectText;
    int         nWidthText, nHeightText;
    HDC         hdc = BeginPaint(hwnd, &ps);
    HPEN        hpen;
    HBRUSH      hbrush;
int i;

#if BGW
    hpen      =     SelectObject(hdc,     (HPEN)
GetStockObject(WHITE_PEN));
    hbrush    =     SelectObject(hdc,   (HBRUSH)
GetStockObject(WHITE_BRUSH));
#else
    hpen      =     SelectObject(hdc,     (HPEN)
GetStockObject(BLACK_PEN));
    hbrush    =     SelectObject(hdc,   (HBRUSH)
```

15

```
GetStockObject(BLACK_BRUSH));
#endif
        // For the vclk test,
    wCorner = 0; // only use upper left corner cross hair
    // first erase whole screen...
    GetClientRect(hwnd, (LPRECT) &rect);
    Rectangle(hdc,    rect.left,    rect.top,    rect.right,
rect.bottom);

// then draw the text and graphics if necessary
#if BGW
    SelectObject(hdc,                              (HPEN)
GetStockObject(BLACK_PEN));
#else
    SelectObject(hdc,                              (HPEN)
GetStockObject(WHITE_PEN));
#endif
        // show target cross hair at screen center
    MoveTo(hdc,  ScreenCenter.x,  ScreenCenter.y -
DYLINE);
    LineTo(hdc,  ScreenCenter.x,  ScreenCenter.y +
DYLINE);
    MoveTo(hdc,    ScreenCenter.x    -    DXLINE,
ScreenCenter.y);
    LineTo(hdc,    ScreenCenter.x    +    DXLINE,
ScreenCenter.y);
#if BGW
    SetBkColor(hdc, RGB(255,255,255));
    SetTextColor(hdc, RGB(0,0,0));
#else
    SetBkColor(hdc, RGB(0,0,0));
    SetTextColor(hdc, RGB(255,255,255));
#endif
    rectText.left = rgptCross[0].x + (2 * DXLINE);
    rectText.top = rectText.bottom = 0;
    rectText.right = rgptCross[3].x - (2 * DXLINE);
#if SHOWRESULTS
    switch(displayType)
    {
    case 0: // pre - test... show n,d values.
        wsprintf(szInstructions, "Vclk Test = %x NR = %d,
DR             =             %d\n
NRmax=%d,NRmin=%d,DRmax=%d,DRmin=%d\nN    D
\n",
                    (int)VclkTest,
                    VtestP.nominalN,VtestP.nominalD,
                    VtestP.maxN,VtestP.minN,
                    VtestP.maxD,VtestP.minD);
        for (i = 0; i < NUM_VCLK_TESTS; i++)
        {
        wsprintf(szInstructionsTemp,"%d  %d \n",
                    (ListVclkSettings+i)->n,
                    (ListVclkSettings+i)->d );
        lstrcat(szInstructions, szInstructionsTemp);
        }
        break;
    case 1: // first test
        lstrcpy(szInstructions, "Noise Values:\n" );
        for (i= 0; i < NUM_VCLK_TESTS; i++)
        {
        wsprintf(szInstructionsTemp,"%d    %x%x-%x
%d,%d\n ",
                    i, (int)((ListVclkSettings+i)->NoiseValue>>16),
                    (int)(ListVclkSettings+i)->NoiseValue
,
                    (int)(ListVclkSettings+i)->tc,
                    (int)(ListVclkSettings+i)->n,
                    (int)(ListVclkSettings+i)->d
                    );
        lstrcat (szInstructions,szInstructionsTemp);
        }
        break;
    case 2:
        lstrcpy(szInstructions, "Preliminary Results:\n" );
        wsprintf(szInstructionsTemp,"\n%d  Winner! \n%d
Place \n%d  Show \n%d Loser", min,place,show, max);
        lstrcat (szInstructions,szInstructionsTemp);
        break;
    case 3:
        lstrcpy(szInstructions, "Final Noise Values:\n" );
        for (i= 0; i < 3; i++)
        {
        wsprintf(szInstructionsTemp,"%d    %x%x-%x
%d,%d\n ",
                    i, (int)((FListVclkSettings+i)->NoiseValue>>16), (int)(FListVclkSettings+i)->NoiseValue ,
                    (int)(FListVclkSettings+i)->tc,
                    (int)(FListVclkSettings+i)->n,
                    (int)(FListVclkSettings+i)->d
                    );
        lstrcat (szInstructions,szInstructionsTemp);
        }
        break;
    case 4:
        lstrcpy(szInstructions, "Final Noise Values:\n" );

for (i= 0; i < 3; i++)
        {
        wsprintf(szInstructionsTemp,"%d    %x%x-%x
%d,%d\n ",
                    i, (int)((FListVclkSettings+i)->NoiseValue>>16), (int)(FListVclkSettings+i)->NoiseValue ,
                    (int)(FListVclkSettings+i)->tc,
                    (int)(FListVclkSettings+i)->n,
                    (int)(FListVclkSettings+i)->d
                    );
```

```
            lstrcat (szInstructions,szInstructionsTemp);
        }
        Win = MinNoiseIndex(FListVclkSettings,3);
        wsprintf(szInstructionsTemp,"\n\nN=%d,  D=%d
Final Winner! \n",
            (int)(FListVclkSettings+Win)->n,
            (int)(FListVclkSettings+Win)->d );
        lstrcat (szInstructions,szInstructionsTemp);
        break;
    } // end switch
#else
    switch(displayType)
    {
    case 0: // pre - test... tell'm what to do.
        LoadString(vhInst,         rsTunePreTest,
(LPSTR)szInstructions,
            INST_STR_MAX_LEN);
        break;
    case 1:
    case 2:
    case 3:
        lstrcpy(szInstructions, "Test In Progress." );
        break;
    case 4:
        lstrcpy(szInstructions, "Test Complete." );
        break;
    } // end switch
#endif
    // Get the dimensions of the text.
    nHeightText = DrawText(hdc, szInstructions, -1,
(LPRECT)&rectText,
        DT_CALCRECT | DT_WORDBREAK);
    nWidthText = rectText.right - rectText.left;
    // Position the text
#if SHOWRESULTS
    rectText.left = (rect.right + rect.left - nWidthText) /
3;
    rectText.right     =     (rect.right  +  rect.left    +
nWidthText) / 2;
    rectText.top    =    (rect.top   +   rect.bottom   -
nHeightText) / 2;
    rectText.bottom    =    (rect.top   +   rect.bottom   +
nHeightText) / 2;
#else
    rectText.left    =    (rect.right    +    rect.left   -
nWidthText)/2 ;
    rectText.right    =    (rect.right    +    rect.left   +
nWidthText)/2;
    rectText.top = (rect.top + PROGBAR_TOP +
PROGBAR_HEIGHT + 20 );
    rectText.bottom = (rect.top + PROGBAR_TOP +
PROGBAR_HEIGHT + 20 + nHeightText);
#endif
    DrawText(hdc,        szInstructions,       -1,
(LPRECT)&rectText, DT_WORDBREAK);
    // SetROP2(hdc, rop);
    SelectObject(hdc, hpen);
    SelectObject(hdc, hbrush);
    EndPaint(hwnd, &ps);
}   // end RepaintVclkTest BOOL FAR PASCAL _loadds VerifyVclkChangesDlg(
    HWND    hDlg,
    WORD    message,
    WORD    wParam,
    LONG    lParam)
{
    switch (message)
    {
        case WM_INITDIALOG:
            BLOCK
            {
                RECT   rectParent, rectMe;
                POINT  pntCenter;
                int    nWidthMe, nHeightMe;
                GetWindowRect(hDlg,         (LPRECT)
&rectMe);
                rectParent.left = rectParent.top = 0;
                rectParent.right             =
GetSystemMetrics(SM_CXSCREEN);
                rectParent.bottom            =
GetSystemMetrics(SM_CYSCREEN);
                pntCenter.x    =    (rectParent.left    +
rectParent.right) / 2;
                pntCenter.y    =    (rectParent.top    +
rectParent.bottom) / 2;
                nWidthMe = rectMe.right - rectMe.left;
                nHeightMe     =     rectMe.bottom     -
rectMe.top;
#if SHOWRESULTS
                SetWindowPos(hDlg,
HWND_TOPMOST,
                    pntCenter.x - (nWidthMe/2) + 120,
0,
                    nWidthMe,           nHeightMe,
SWP_NOZORDER);
#else
                SetWindowPos(hDlg,
HWND_TOPMOST,
                    pntCenter.x - (nWidthMe/2) +100,
pntCenter.y - (nHeightMe/2)+120 ,
                    nWidthMe,           nHeightMe,
SWP_NOZORDER);
#endif
            }
            //  SetTimer(hDlg, idTimer, uTimeOut*1000,
NULL);
            return TRUE;
        case WM_COMMAND:
            switch (wParam)
            {
                case idcApply:
                    // KillTimer(hDlg, idTimer);
                    PostMessage(vhDlgCal,
```

17

```
                WM_ApplyVclkChanges, NULL, NULL);
                        EndDialog(hDlg, 0);
                        break;
                    case idcReset:
                        // KillTimer(hDlg, idTimer);
                        PostMessage(vhDlgCal,
                WM_ResetVclkChanges, NULL, NULL);
                        EndDialog(hDlg, 0);
                        break;
                    case IDOK:
                        // KillTimer(hDlg, idTimer);
                        PostMessage(vhDlgCal,
                WM_AcceptVclkChanges, NULL, NULL);
                        EndDialog(hDlg, 0);
                        break;
                    case IDCANCEL:
                        // KillTimer(hDlg, idTimer);
                        PostMessage(vhDlgCal,
                WM_RefuseVclkChanges, NULL, NULL);
                        EndDialog(hDlg, 0);
                        break;
                    case idcRecalibrate:
                        // KillTimer(hDlg, idTimer);
                        PostMessage(vhDlgCal,
                WM_RunVclkCal, NULL, NULL);
                        EndDialog(hDlg, 0);
                        break;
                    }
                    return TRUE;
                case WM_CLOSE:
                    EndDialog(vhDlgVerify, FALSE);
                    vhDlgVerify = NULL;
                    return TRUE;
        #if 0
                case WM_TIMER:
                    MessageBeep(0);
                    KillTimer(hDlg, idTimer);
                    PostMessage(vhDlgCal,
                WM_RefuseChanges, NULL, NULL);
                    EndDialog(hDlg, 0);
                    return TRUE;
        #endif
                }
                return FALSE;
            } // end VerifyVclkChangesDlg
        long GetNoise(long* count)
        {
        long noiseValue = 0;
        long teleCount = 0;
            // VXD might take some time to gather data an calc the
        value so..
            // keep tryin' til we get non-zero value.
            while(noiseValue == 0)
            {
              if       (         SendDriverMessage(hDriverPen,
        DRV_GetNoiseValue,
                        (DWORD)(LPDWORD)&noiseValue,
                        (DWORD)(LPDWORD)&teleCount ) == 0 )
            {
              noiseValue = 1;
            }
          }
          *count = teleCount;
          return noiseValue;
        }
        #if 0
        Note: The above function, GetNoise(), obtains a noise value
        by sending
        the pen driver a message (DRV_GetNoiseValue).  As a
        result, the following
        code is executed in the pen driver.  As you can see, zero
        values are sent
        if the pen driver is in the process of collecting data.  Once
        the data is
        collected, a noise value is calculated from the values in the
        DataPoints
        buffer.  This value is returned to the caller i.e. the
        GetNoise() function
        above.  Notice that &noiseValue  above corresponds to
        lParam1 below.
                DRV_GetNoiseValue:
                {
                        if (CollectingData)
                        {
                            *(LPDWORD)lParam1 = 0L;  // zero indicates
        we're not
                                            // ready to send a value.
                        }
                        else
                        {
                            *(LPDWORD)lParam1     =     (DWORD)
        CalcNoise();
                            *(LPDWORD)lParam2     =     (DWORD)
        BadTeleCount;
                                BadTeleCount = 0;  // setup for next test.
                                BadTipUpCount = 0;  // setup for next test.
                        } dwRet = DRV_SUCCESS;
                        break;
                }
        The CalcNoise() function is called once the data is collected
        in the
        DataPoints[] buffer.

The CalcNoise() function is shown below.

#define NOISY_DATA 0x70000000
        long CalcNoise(void)
        {
            unsigned long mean_x = 0, mean_y = 0;
            long sigma_x = 0, sigma_y = 0, sigma = 0;
            int index;
            // return NOISY_DATA;
```

18

```
if (BadTipUpCount <= 10 && BadTeleCount <= 100)
{
    // Add up all values to get average
    for(index=0; index < NUM_DATA_POINTS; ++index)
    {
        mean_x += DataPoints[index].x;
        mean_y += DataPoints[index].y;
    }
    mean_x /= NUM_DATA_POINTS;
    mean_y /= NUM_DATA_POINTS;
    for(index=0; index< NUM_DATA_POINTS; ++index)
    {
        sigma_x += ( DataPoints[index].x - mean_x) * (
DataPoints[index].x - mean_x);
        sigma_y += ( DataPoints[index].y - mean_y) * (
DataPoints[index].y - mean_y);
    }
    sigma = sigma_x + sigma_y;
    sigma += (sigma*BadTeleCount)/10;
}
else
{
    sigma = NOISY_DATA ; // render data useless.
}
return (sigma);
}
endif include <windows.h>
include <math.h>
#include "fgen.h"

void _loadds get_all_clk_ratios(PCLKSETTING  pvclks,
PTESTPARAM pTP)
{
    int index;
    static int n_buf;  // working variables
    static int d_buf;
    float val;
    float startVal;
    float increment;
    float incrementPercent;
    float nominal;
    int result;
    int nominalIndex;
    int prev_n = pTP->nominalN;
    int prev_d = pTP->nominalD;
    nominal                                          =
(float)pTP->nominalN/(float)pTP->nominalD ;
    startVal    =    nominal    *    ((float)1.0   -
(float)(pTP->percentBelow) * (float)1e-02 );
    incrementPercent   =   (float)(pTP->percentBelow  +
pTP->percentAbove)/(float)pTP->numTests;
    increment = nominal * incrementPercent * (float)1e-02;
    nominalIndex =(int)((nominal - startVal) / increment);
    if (nominalIndex >= pTP->numTests)
```

```
    nominalIndex = pTP->numTests - 1;
    val = startVal;
    for(index=0; index<pTP->numTests; ++index)
    {
        n_buf = pTP->nominalN;
        d_buf = pTP->nominalD;
        if (index == nominalIndex)
        {
            val = nominal;
        }
        result = get_clk_ratio(val,&n_buf,&d_buf,pTP);
        if (result == 1)
        {
            (pvclks + index)->n = n_buf;
            (pvclks + index)->d = d_buf;
        }
        else
        {
            (pvclks + index)->n = prev_n;
            (pvclks + index)->d = prev_d;
        }
        // save for next turn.
        prev_n = (pvclks + index)->n ;
        prev_d = (pvclks + index)->d ;
        val += increment;
    }
}
int _loadds get_clk_ratio(float value, int* nptr, int* dptr,
PTESTPARAM pTP)
{
    int n_buf,d_buf;
    float err ;
    float errLim = (float)0.005;
    float trial;
    BOOL oversized = FALSE;
    int trialCount = 0;
    int maxCount;
    maxCount = pTP->maxD - pTP->minD;
    d_buf = 1; // start with a nice round (small) number.
    if (d_buf < pTP->minD)         // Get denom in range
        d_buf = pTP->minD;
    n_buf = -1;
    while (n_buf < pTP->minN)      // Get numer in range
    {
        n_buf =(int)(value*(float)d_buf + (float)0.5);
        d_buf++;
        trialCount++;
    }
    while(trialCount++ < maxCount)
    {
        // Determine a trial numerator
        n_buf =(int)(value*(float)d_buf + (float)0.5);
        if (n_buf > pTP->maxN || n_buf < pTP->minN)
            return -2;  // Let's keep this simple
        if (d_buf > pTP->maxD || d_buf < pTP->minD)
            return -3;  // Let's keep this simple
```

19

```
            // Prevent divide by zero and bogus values
            if (d_buf <= 0 || n_buf <= 0)
              return -4;
            trial = (float)n_buf/(float)d_buf;
            // Check tolerance
            err = (float) fabs( trial - value) / value;
            if(err < errLim)   // All set.. quit.
            {
                *nptr = n_buf;
                *dptr = d_buf;
                return 1;
            }
            // Failed test. Try new denomonator
            d_buf++;
        } // end while
        return -1;
}
int MinNoiseIndex (PCLKSETTING pvclks,int count)
{
  int i;
  int minIndex = 0;
      for(i=0; i < count ; i++)
      {
        if         ((pvclks+i)->NoiseValue      <
(pvclks+minIndex)->NoiseValue )
            minIndex = i;
      }
    return minIndex;
}
int MaxNoiseIndex (PCLKSETTING pvclks, int count)
{
  int i;
  int maxIndex = 0;
      for(i=0; i < count ; i++)
      {
        if         ((pvclks+i)->NoiseValue      >
(pvclks+maxIndex)->NoiseValue )
            maxIndex = i;
      }
    return maxIndex;
}
void* GetMem(int size, HANDLE* hndl)
{
HANDLE h1;
      h1 = LocalAlloc(LPTR,size);
      *hndl = h1;
      if(!h1)
      {
        return NULL;
      }
      return (void*)LocalLock(h1);
}
void FreeMem(HANDLE h1)
{
  if (h1)
  {
   LocalUnlock(h1);
```

```
   LocalFree(h1);
  }
} ifndef _FGEN_H_
define _FGEN_H_
#define NUM_WCLK_TESTS        20
#define WCLK_PERCENT_DEV_UP   0
#define WCLK_PERCENT_DEV_DOWN 10
#define MAX_WCLK_POINTS       10
#define NUM_VCLK_TESTS        20
#define VCLK_PERCENT_DEV_UP   0
#define VCLK_PERCENT_DEV_DOWN 10
#define MAX_VCLK_POINTS       10
typedef struct _TestParam // Parameters used as basis for
test
{
      int nominalN;
      int nominalD;
      int percentAbove;
      int percentBelow;
      int numTests;
      int minN;
      int maxN;
      int minD;
      int maxD;
} TESTPARAM;
typedef TESTPARAM *PTESTPARAM;
typedef struct _ClkSetting  // Vclk frequency is set via
numerator and denom
{
  // Vclk frequency is set via numerator and denominator
  // set in registers in the video chip.
  // Each setting will produce an associated noise value
  // which will be evaluated. Smaller noise values are better of
course.
      int n;
      int d;
      long NoiseValue;
      long tc;
} CLKSETTING;
typedef CLKSETTING *PCLKSETTING;
typedef struct _ClkRatio  // A clk frequency is set via
numerator and denom
{
  // Clock frequency is set via numerator and denominator
  // set in registers in the video chip or clk gen chip.
  // Vpend.vxd communicates n and d via DWORD as
follows:
      BYTE d;
      BYTE n;
      BYTE rsvd1;
      BYTE rsvd2;
} CLKRATIO;

void     _loadds    get_all_clk_ratios(PCLKSETTING,
```

```
PTESTPARAM);
int   _loadds  get_clk_ratio(float   value,   int*,   int*,
PTESTPARAM);
int MinNoiseIndex (PCLKSETTING pvclks,int count);
int MaxNoiseIndex (PCLKSETTING pvclks,int count);
void* GetMem(int size, HANDLE* hndl);
void FreeMem(HANDLE h1);
#endif
```

What is claimed is:

1. A method for reducing interference in a display coupled with a stylus driven digitizing panel, each of said display and said stylus having an operating frequency comprising:
   (a) determining at least one of the operating frequency of the display and the operating frequency of the stylus;
   (b) adjusting at least one of the operating frequency of the display and the operating frequency of the stylus until the operating frequency causing a reduction in interference is ascertained, said interference caused by an interaction between said display operating frequency and said stylus operating frequency; and
   (c) setting the operating frequency to said operating frequency ascertained to cause the reduced interference.

2. The method of claim 1 wherein the operating frequency of the display is the horizontal scan frequency.

3. The method of claim 1 wherein the operating frequency of said display is selectable and the operating frequency of said stylus is fixed and wherein the operating frequency of the stylus is at least one of known and determined and the operating frequency of said display is determined and adjusted incrementally until the operating frequency of said display causing the least interference is ascertained and wherein said ascertained least interference frequency of said display is selected.

4. The method of claim 3 wherein a user assists in the selection of said operating frequency.

5. The method of claim 4 further comprising displaying a target on the display and directing the user to hold the stylus on the displayed target until the operating frequency of least interference is ascertained.

6. The method of claim 5 wherein said ascertaining step includes setting said operating frequency is set to a test frequency lower than said determined operating frequency before at least one intermediate frequency is tried between said operating frequency and said test frequency to thereby ascertain which of said operating, test, and intermediate frequency provides the least interference.

7. The method of claim 6 wherein said operating frequency ascertained to cause the least interference is determined in at least part by the frequency introducing the least variance between the coordinates between the displayed target and the position of the stylus.

8. A method for operating a display and digitizer system, comprising the steps of:
   measuring noise produced at least partially by an external signal source; and
   adjusting an operating frequency of the display to reduce the noise;
   wherein the operating frequency of said display is selectable and the operating frequency of said digitizer is fixed and wherein the operating frequency of the digitizer is at least one of known and determined and the operating frequency of said display is determined and adjusted incrementally until the operating frequency of said display causing the least interference is ascertained and wherein said ascertained least interference frequency of said display is selected.

9. The method of claim 8 wherein a user assists in the selection of said operating frequency.

10. The method of claim 9 further comprising displaying a target on the display and directing the user to hold a stylus on the displayed target until the operating frequency of least interference is ascertained.

11. The method of claim 10 wherein said ascertaining step includes setting said operating frequency is set to a test frequency lower than said determined operating frequency before at least one intermediate frequency is tried between said operating frequency and said test frequency to thereby ascertain which of said operating, test, and intermediate frequency provides the least interference.

12. The method of claim 11 wherein said operating frequency ascertained to cause the least interference is determined in at least part by the frequency introducing the least variance between the coordinates between the displayed target and the position of the stylus.

13. An apparatus for reducing interference in a display and digitizing panel system wherein said display has a scan frequency and said digitizing panel has a stylus input, comprising:
   (a) a controller operably connected to said display and controlling the scan frequency of said display, said controller displaying a target on said display and prompting a user to touch the stylus to the displayed target; and
   (b) a stylus and target variance determiner determining the scan frequency producing a reduced stylus and target variance and for selecting the scan frequency producing the reduced stylus and target variance.

14. A method for reducing interference in a display coupled with a stylus driven digitizing panel, each of said display and said stylus having an operating frequency, comprising:
   (a) determining at least one of the operating frequency of the display and the operating frequency of the stylus;
   (b) adjusting at least one of the operating frequency of the display and the operating frequency of the stylus to a plurality of test frequencies;
   (c) ascertaining which of said plurality of test frequencies causes reduced interference; and
   (d) setting the operating frequency to one of said test frequencies ascertained to cause the reduced interference.

15. The method of claim 14 wherein the operating frequency of the display is the horizontal scan frequency.

16. The method of claim 14 wherein the operating frequency of said display is selectable and the operating frequency of said stylus is fixed and wherein the operating frequency of the stylus is at least one of known and determined and the operating frequency of said display is determined and adjusted incrementally until the operating frequency of said display causing the least interference is ascertained and wherein said ascertained least interference frequency of said display is selected.

17. The method of claim 16 wherein a user assists in the selection of said operating frequency.

18. The method of claim 17 further comprising displaying a target on the display and directing the user to hold the stylus on the displayed target until the operating frequency of least interference is ascertained.

19. The method of claim 18 wherein said ascertaining step includes setting said operating frequency is set to a test frequency lower than said determined operating frequency before at least one intermediate frequency is tried between said operating frequency and said test frequency to thereby ascertain which of said operating, test and intermediate frequency provides the least interference.

20. The method of claim 19 wherein said operating frequency ascertained to cause the least interference is determined in at least part by the frequency introducing the least variance between the coordinates between the displayed target and the position of the stylus.

21. A method for reducing interference in a display coupled with a stylus driven digitizing panel, comprising:

(a) determining at least one of the operating frequency of the display and the operating frequency of the stylus;

(b) adjusting at least one of the operating frequency of the display and the operating frequency of the stylus until the operating frequency causing a reduced interference is ascertained; and (c) setting the operating frequency to said operating frequency ascertained to cause the reduced interference, wherein the operating frequency of said display is selectable and the operating frequency of said stylus is fixed and wherein the operating frequency of the stylus is at least one of known and determined and the operating frequency of said display is determined and adjusted incrementally until the operating frequency of said display causing the least interference is ascertained and wherein said ascertained least interference frequency of said display is selected.

22. The method of claim 21 wherein a user assists in the selection of said operating frequency.

23. The method of claim 22 further comprising displaying a target on the display and directing the user to hold the stylus on the displayed target until the operating frequency of least interference is ascertained.

24. The method of claim 23 wherein said ascertaining step includes setting said operating frequency is set to a test frequency lower than said determined operating frequency before at least one intermediate frequency is tried between said operating frequency and said test frequency to thereby ascertain which of said operating, test, and intermediate frequency provides the least interference.

25. The method of claim 24 wherein said operating frequency ascertained to cause the least interference is determined in at least part by the frequency introducing the least variance between the coordinates between the displayed target and the position of the stylus.

26. An apparatus for reducing interference in a display coupled with a stylus driven digitizing panel system, said apparatus comprising:

a display, said display having an operating frequency;

a stylus, said stylus having an operating frequency;

a digitizing tablet; and a controller operably connected to at least one of said display and said stylus, said controller:

determining at least one of the operating frequency of the display and the operating frequency of the stylus;

adjusting at least one of the operating frequency of the display and the operating frequency of the stylus until the operating frequency causing a reduced interference is ascertained, said interference caused by an interaction between said display and said stylus; and setting the operating frequency to said operating frequency ascertained to cause the reduced interference.

27. The apparatus of claim 26 wherein the operating frequency of the display is the horizontal scan frequency.

28. The apparatus of claim 26 Wherein the operating frequency of said display is selectable and the operating frequency of said stylus is fixed and wherein the operating frequency of the stylus is at least one of known and determined and the operating frequency of said display is determined and adjusted incrementally until the operating frequency of said display causing the least interference is ascertained and wherein said ascertained least interference frequency of said display is selected.

29. The apparatus of claim 28 wherein a user assists in the selection of said operating frequency.

30. The apparatus of claim 29 further comprising displaying a target on the display and directing the user to hold the stylus on the displayed target until the operating frequency of least interference is ascertained.

31. The apparatus of claim 30 wherein said ascertaining step includes setting said operating frequency is set to a test frequency lower than said determined operating frequency before at least one intermediate frequency is tried between said operating frequency and said test frequency to thereby ascertain which of said operating, test, and intermediate frequency provides the least interference.

32. The apparatus of claim 31 wherein said operating frequency ascertained to cause the least interference is determined in at least part by the frequency introducing the least variance between the coordinates between the displayed target and the position of the stylus.

* * * * *